United States Patent [19]

Galan Inchaurbe

[11] Patent Number: 4,591,286
[45] Date of Patent: May 27, 1986

[54] SPACIAL STRUCTURE

[76] Inventor: José M. J. Galan Inchaurbe, Estrada Mazustegui, 2 y 4, Bilbao, Spain

[21] Appl. No.: 585,989

[22] Filed: Mar. 2, 1984

[51] Int. Cl.⁴ .............................................. F16B 7/00
[52] U.S. Cl. ................................. 403/170; 403/171; 403/176; 52/648
[58] Field of Search ............... 403/170, 171, 172, 175, 403/176; 52/181, 648

[56] References Cited

U.S. PATENT DOCUMENTS

| 2,212,455 | 8/1940 | Reed | 403/170 X |
| 3,632,147 | 1/1970 | Finger | 403/171 |
| 3,861,107 | 1/1975 | Papayoti | 403/172 X |
| 4,027,449 | 6/1977 | Cilveti | 403/171 X |
| 4,161,088 | 7/1979 | Gugliotta et al. | 403/176 X |
| 4,213,718 | 7/1980 | Lumby | 403/197 |
| 4,353,662 | 10/1982 | Du Chateau | 403/171 |
| 4,355,918 | 10/1982 | Van Vliet | 403/170 |
| 4,480,418 | 11/1984 | Vantrella | 403/171 X |

FOREIGN PATENT DOCUMENTS 1391973  2/1965  France ................. 403/171

Primary Examiner—Cornelius J. Husar
Assistant Examiner—Todd G. Williams
Attorney, Agent, or Firm—Michael J. Striker

[57] ABSTRACT

A special structure comprising equidistantly positioned knuckles, a set of sections, and means for joining either end of said sections to said knuckles, where each knuckle is made up from two hollow base pieces whose outside shape is approximately that of a spherical shell in which there is a number of equidistantly positioned holes at an angular distance of a width respect to one another. At least one of the base pieces has a perimeter area which is bent inwards. An arrangement for the attachment of the first base piece is provided. When the base pieces are joined together all equidistantly positioned holes lie at an angular distance with respect to one another.

5 Claims, 5 Drawing Figures

SPACIAL STRUCTURE

BACKGROUND OF THE INVENTION

Spacial structures that comprise a number of sections whose ends are joined to a number of knuckles to make reticular spacial structures are known.

In particular, the spacial structure whose knuckles are comprised of solid balls to which tubular sections are joined is known.

The spacial structure whose knuckles are comprised of two spherical shells joined together by means of external fins is also known.

The chief drawback with the first of the aforementioned systems lies in the difficulty on site with joining the tubular sections to a solid ball, and so it can only be worked on from the outside.

The second of the systems mentioned presents the serious difficulty of the fins for joining to the spherical shells, imposing enormous restrictions upon the reticular assembly of the relevant tubular members.

SUMMARY OF THE INVENTION

The present invention overcomes these disadvantages by developing a knuckle that is comprised of two internally hollow parts with no outside protrusions to restrict reticulation.

The spacial structure covered by this invention, which is comprised of equidistantly positioned knuckles, an assembly of sections and means for joining these sections at each end to said knuckles, is novel because it is made up from:

(a) a first hollow base piece whose external shape is approximately that of a spherical shell in which there is a number of equidistantly positioned holes at an angular distance of $\alpha_1$ and with a perimeter area that is bent towards the inside, (b) a second hollow base piece whose external shape is approximately that of a spherical shell in which there is a number of equidistantly positioned holes at an angular distance of $\alpha_1$, (c) means of linkage between the first base piece and the second base piece which, upon being joined together, forms the knuckle of the spatial structure, with all the holes being equidistantly positioned with respect to one another at an angular distance of $\alpha_1$.

It is a feature of the present invention that the second base piece possesses a bent perimeter area facing the bent area on the first base piece, making a joining area.

It is another feature of the present invention that the bent area on the second base piece faces outwards.

It is still another feature of the present invention that the bent area on the second base piece faces inwards.

It is yet another feature of the present invention that the means of linkage between the first base piece and the second base piece comprise a strength member in internal contact with the poles of both spherical shells, and means for tightening the strength member up against the poles.

It is yet still another feature of the present invention that the means for tightening comprise a stud which runs through the middle of the strength member, goes through both spherical shells, and has a stop on one end and a thread for tightening on the other.

It is yet a further feature of the present invention that the means of linkage between the first base piece and the second base piece is comprised of threaded screws at the joining area.

It is yet another feature of the present invention that one of the base pieces possesses protrusions which engage inside grooves provided for the purpose in the joining area upon the other base piece.

It is still another feature of the present invention that the means for joining the sections to the knuckles are comprised of:

(a) a single-piece element with inside thread and rigidly attached to the section to be joined, and with its face supported upon the outer wall of a base piece.

(b) a pressure screw whose head rests against the inner wall of a base piece and whose body, after going through one of the equidistantly positioned holes, is threaded into the single-piece element.

It is still yet another feature of the present invention that the contact areas between the single-piece element and the base piece, and the screw head and the base piece are spherical.

It is yet another feature of the present invention that the single-piece element in revolution has at least one side surface which is shaped like a conical frustum.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

In order to provide a better understanding of the invention, drawings are attached to show a preferred practical construction thereof, this being subject to those minor alterations which do not affect the basic features, and wherein.

DETAILED DESCRIPTION OF THE PREFERRED EMBODIMENTS

Figure 1:
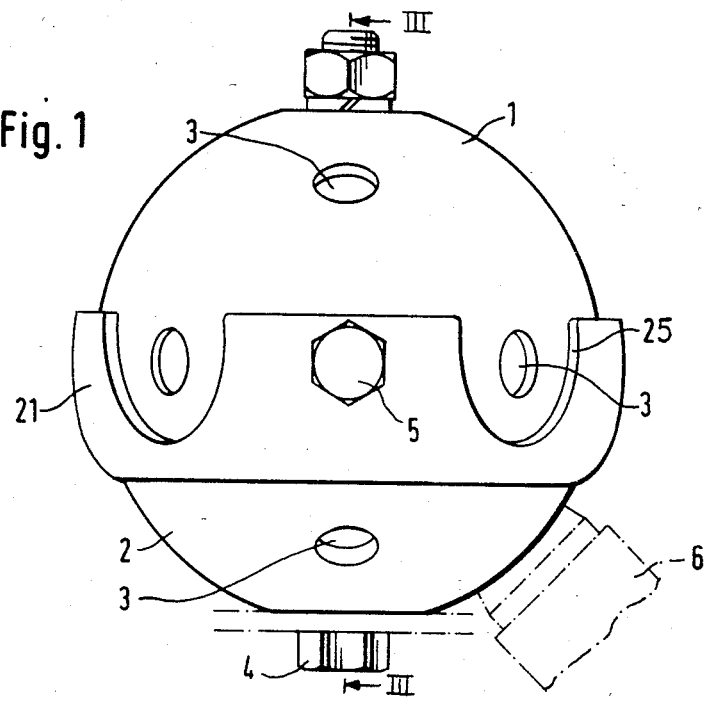
FIG. 1 is an elevational view of a knuckle as covered by the present invention, where the lower base piece joining area covers the equator of the knuckle, and where the screwed attachment between the two parts is effected upon said equator.

Referring now to the drawings in detail, and firstly to FIG. 1 thereof, the knuckle according to the invention includes a lower base piece 2 and an upper base piece 1.

Generally, base piece (1) is larger than base piece (2), giving an asymmetrical joint, but it is perfectly feasible for both pieces to be practically alike.

As shown in FIG. 1 the outside shape of the two base pieces 1 and 2 is spherical in order that its external form in the assembly would be approximately a complete sphere.

Figure 3:
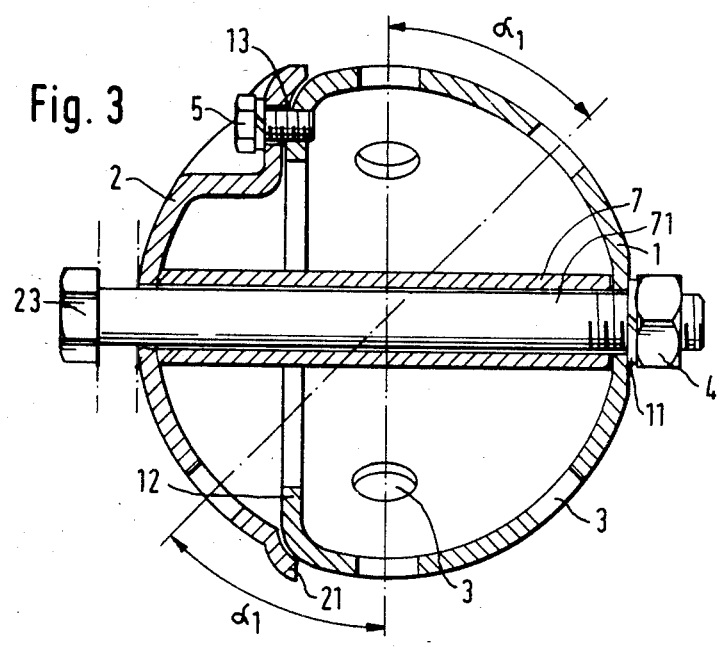
FIG. 3 is a section taken on line III—III of FIG. 1 and turned by 90°.

Holes (3) provided upon each of the spherical shells or base pieces are equidistantly positioned with respect to one another. As shown in FIG. 3 an angle $\alpha_1$ is defined between central axes of adjoining holes of the spherical shells when they are assembled together.

Figure 5:
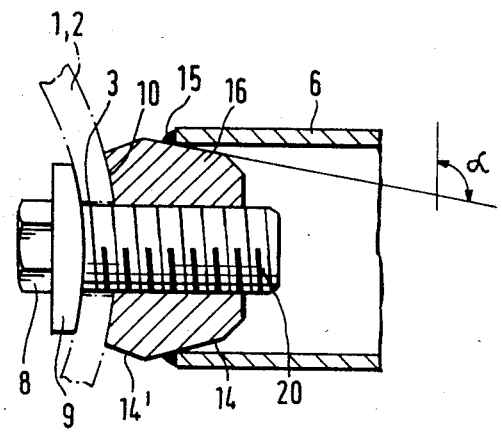
FIG. 5 is a section of the joint between a section member and a base piece of the knuckle.

As shown in FIG. 5 illustrating a joint between a tubular section and a base piece of the knuckle, holes (3) form part of the joint between the spacial knuckle and each tubular section.

Said angles $\alpha_1$ can be altered for each knuckle and each different structure.

As shown in FIG. 3, the first base piece (1) has a perimeter area (12) which is bent inwardly from the spherical portion of the base piece and is provided with holes (13) which are preferably threaded to receive the screws.

Said holes (13) form part of the joint between the two base pieces (1) and (2).

As also shown in FIG. 3, the other base piece (2) in turn has a lip (21) into which engages the lip (12) provided on base piece (1). Lip (21) is also shown in FIGS. 1 and 2.

In the embodiment of FIG. 1 and FIG. 3, the lip (21) is shown as engaging lip (12), but in the embodiment of FIG. 1 the two lines can engage each other by means of protrusions (30).

As shown in FIG. 1 the lip 21 of the base piece (2) is provided with slots (25) which facilitate the engagement and joining with tubular sections (6).

Figure 2:
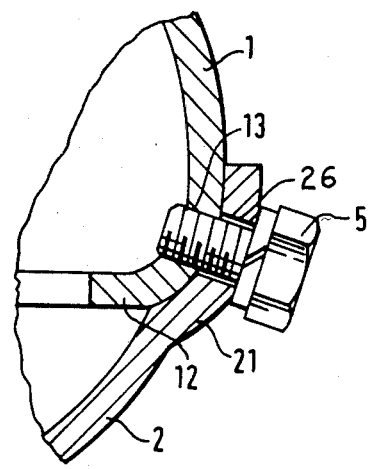
FIG. 2 is a a partial sectional view of the screwed attachment when same is effected below the equator.

As shown in FIG. 2, the base piece (2) is furthermore provided opposite the holes (13) in base piece (1), with open holes (26), and joining screw (5) is housed in said holes (13) and (26).

Figure 4:
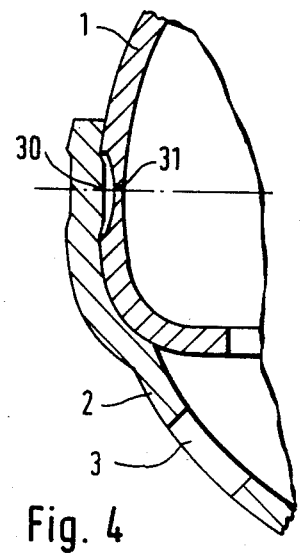
FIG. 4 is a section showing the joint region of the two base pieces by means of protrusions; and according to a modified embodiment.

As mentioned above, in the embodiment of FIG. 4, base piece (2) is provided with protrusions (30) which are engaged in slots (31) formed in base piece (1), although it is more logical to think of the reverse construction.

As shown in FIG. 3, the knuckle of this spacial structure is completed with a strength member (7), which may be a tubular element the ends of which abut abuts against the inner walls of the base pieces.

A stud (71) is provided inside tubular element (7), whose head (23) abuts against pole (22), and by means of nut (4), it abuts under pressure against washer (11), thus securing base pieces (1) and (2) to one another.

FIG. 5 shows a single-piece element (16) in revolution which is attached to tubular section by weld (15).

Said single-piece element (16) has a conical frustrum side surface in order for it to suit different diameters of tube (6).

A tightening screw (20) has a head (8) which, either directly or by means of a widened area (9) or an additional member such as a washer having the same shape, is attached to the inside surface of base piece (1), (2). The contact face of the widened area (9) is spherical so as to facilitate contact.

The single-piece element (16) further has a face (10) which is attached to the outside face of the same base piece (1), (2), and said contact face is spherical as well for the reasons given above.

Screw (20) and single-piece element (16) are threaded together in engagement, thus accomplishing the joint between tubular section (6) and base piece (1), (2).

The design can also be such that a side surface (14') adjacent to the joining face (10) is shaped as a conical frustrum, thus preventing said contact face (10) from being excessively large.

It is to be noted that the joining means comprised (a) of the strength member (7) with its stud (71) and fittings, and (b) of screw (5) in the engagement area, can be used either individually or together, and the presence of protrusions (30) is always optional.

It will be understood that each of the elements described above, or two or more together, may also find a useful application in other types of constructions differing from the types described above.

While the invention has been illustrated and described as embodied in a spatial structure it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A knuckle for a spacial structure, comprising:
a first hollow substantially spherical base piece provided with a first plurality of equidistantly positioned holes and formed with an inwardly bent perimeter lip;
a second hollow substantially peripheral base piece provided with a second plurality of equidistantly positioned holes and formed with an outwardly bent perimeter lip which faces and externally engages said inwardly bent perimeter lip so as to form a joining area of said first and second base pieces; and
a plurality of means for joining said first and second hollow base pieces to each other so that all holes of said first and second plurality of holes are equidistantly positioned from each other, some of said joining meand connecting said first base piece at said joining area.

2. The knuckle as defined in claim 1, wherein said means for joining said first and second hollow base pieces include a strength member positioned in the knuckle and means for tightening said strength member in said first and second hollow base pieces.

3. The knuckle as defined in claim 2, wherein said strength member is a tubular element, said means for joining said first and second hollow base pieces further include a stud having ends and passing through an interior of said strength member and said first and second hollow base pieces, said means for tightening said strength member including a head disposed on one of said ends of said stud and a thread for tightening being formed on another of said ends of said stud.

4. The knuckle as defined in claim 2, wherein said means for joining said first and second hollow base pieces further include threaded screws disposed in said joining area.

5. The knuckle as defined in claim 1, wherein one of said lips has protrusions which engage with slots formed at said joining area in the other one of said lips.

* * * * *